Oct. 7, 1969     J. R. OLSON     3,471,070
AUTOMOTIVE BUMPER PROVIDING ARTICLES STORAGE SPACE
Filed July 5, 1967
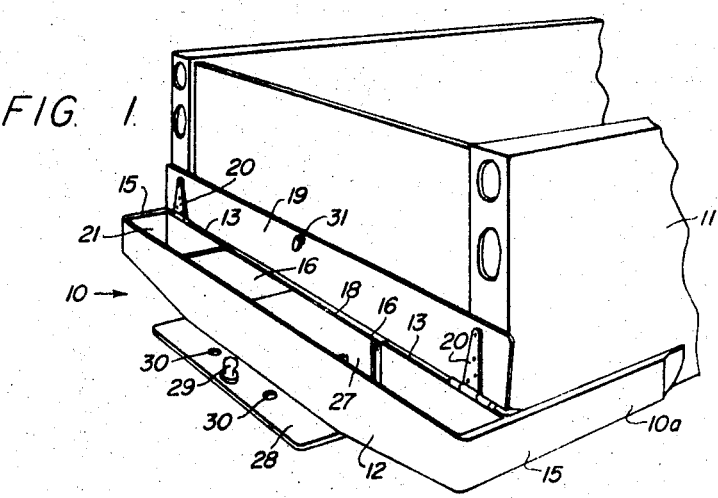
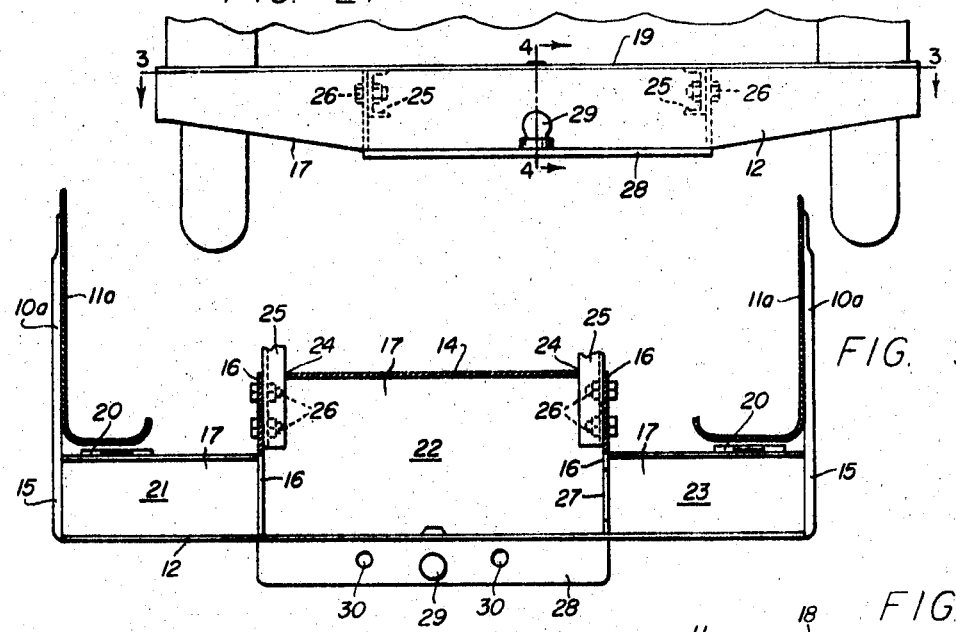
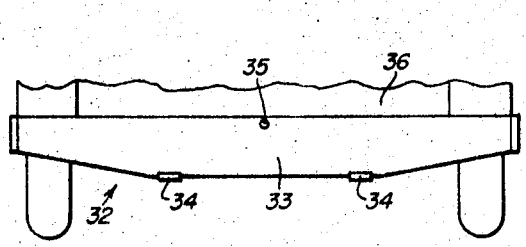
INVENTOR.
JOHN ROBERT OLSON
BY *Mallinckrodt and Mallinckrodt*
ATTORNEYS

United States Patent Office 3,471,070
Patented Oct. 7, 1969

3,471,070
AUTOMOTIVE BUMPER PROVIDING ARTICLES STORAGE SPACE
John Robert Olson, P.O. Box 689, Price, Utah 84501
Filed July 5, 1967, Ser. No. 651,290
Int. Cl. B60r 9/06
U.S. Cl. 224—42.04    7 Claims

ABSTRACT OF THE DISCLOSURE

As an article of manufacture, a compartmented bumper adapted for rigid securement to preferably the rear end of an automotive vehicle for carrying various items of equipment, such as jack, tools, tire chains, etc. The bumper has a door, which can be opened to provide access to the compartmented, chest-like interior. In its preferred form for use with a pick-up truck, the bumper may be provided with a step plate projecting outwardly at its bottom to afford convenient access to the truck bed and to accommodate a trailer hitch, if desired.

BACKGROUND OF THE INVENTION

Field

The invention relates to bumpers for automotive vehicles especially pick-up trucks as widely used by farmers, sportsmen, businessmen, etc. for a variety of utility purposes.

Prior art

Automotive bumpers, including those ordinarily used with pick-up trucks, are normally merely ornamental protective devices. Although it has been proposed heretofore to apply various types of storage boxes to the rear of vehicles, either with or without bumpers, a generally acceptable arrangement adaptable to pick-up trucks has not been available. The following patents are typical: Brown, U.S. Patent No. 1,451,202; Petersen, U.S. Patent No. 1,520,259; McFadden, U.S. Patent No. 1,609,274; Smith, U.S. Patent No. 2,080,989.

SUMMARY OF THE INVENTION

The invention is concerned with making the bumper of an automotive vehicle, particularly a pick-up truck, serve a useful, article-storage purpose additionally to and without interfering with its normal protective function. To this end, the bumper is formed as a narrow, elongate, and rigid box structure having its interior divided into compartments by partition walls that extend transversely to the length of the bumper and outwardly thereof intermediate its length as a box extension for rigid securement to the chassis or other frame portion of the automotive vehicle, and having at least one of its walls openable and closeable as a cover or door to afford access to its interior.

DESCRIPTION OF THE DRAWINGS

In the accompanying drawings forming a part of this specification and illustrating the best mode presently contemplated of carrying out the inventtion:

FIG. 1 is a fragmentary perspective view showing the rear end of a pick-up truck provided with a bumper conforming to the invention and having its top wall hinged as a cover and shown in open position revealing the compartmented interior;

FIG. 2, a fragmentary rear elevation of the truck and bumper; with the cover of the bumper in closed position and chassis connection indicated by dotted lines;

FIG. 3, a horizontal section on line 3—3 of FIG. 2, omitting the automotive wheels but showing the box extension and chassis interconnection;

FIG. 4, a vertical section on line 4—4 of FIG. 2; and

FIG. 5, a view corresponding to that of FIG. 2 but drawn to smaller scale and showing a somewhat different form of the invention, wherein the rear wall of the bumper is hinged as a door to open from the top downwardly.

DETAILED DESCRIPTION OF THE PREFERRED EMBODIMENTS

The bumper indicated 10 in FIG. 1 is of a general type often used at the rear of pick-up trucks, such as the truck 11. It extends entirely across the rear end of the truck and has forwardly extending portions 10a at its ends that embrace the sides of the vehicle and serve both protectively and ornamentally.

As constructed in accordance with the invention, bumper 10 has a straight rear wall 12; mutually spaced forward wall portions 13, respectively, FIGS. 1 and 3, at opposite ends of the bumper; an intermediate forward wall portion 14 offset forwardly from the forward wall portions 13; opposite end walls 15, respectively; mutually spaced partition walls 16, respectively, that extend transversely of the bumper intermediate its length and forwardly to connect opposite ends of forward wall portion 14 with the respective forward wall portions 13, see particularly FIG. 3; a bottom wall 17; and a partial top wall 18, FIG. 4. All of these walls are formed from steel plate and are welded together to provide a strong and rigid chestlike structure. Rear wall 12, end walls 15, and forwardly extending bumper portions 10a are advantageously a single elongate piece of plate steel bent to shape and welded to adjoining walls. The bumper portions 10a fit closely against the fenders 11a, respectively, of the truck 11 in customary manner.

In this embodiment, the top wall is completed by a major top wall portion 19, hinged at 20, FIG. 1, to the mutually spaced, forward wall portions 13, and is openable and closeable as a cover or door affording access to the compartmented interior of the bumper.

It should be noted that partition walls 16 divide bumper 10 into three compartments, 21, 22, and 23, and that the intermediate compartment 22 extends forwardly under the bed of the truck to receive—through mutually spaced receiving apertures 24, respectively, FIG. 3, cut in the intermediate forward wall portion 14—rearwardly projecting ends of truck chassis or frame stringers 25, which, as shown, are structural steel channels.

Rigid securement of the thus interconnected bumper and truck chassis or frame is advantageously effected by sets of bolts 26.

In order to accommodate long articles, such as bumper jacks, a portion of one of the partition walls 16 within the bumper proper may be cut away, as at 27, without seriously weakening the structure.

It is desirable that a step plate 28 be welded or otherwise attached at the bottom of the bumper 10, intermediate the length and projecting rearwardly for enabling a person to step onto the bumper when the top 19 is closed to get into or inspect articles in the bed of truck 11. Step plate 28 also conveniently serves to mount a conventional trailer hitch 29 and to provide anchor holes 30 for the customary hitch chains.

It is advantageous to provide bumper top 19 with a latch or lock 31 so it can be secured in closed position.

In the embodiment shown in FIG. 5, no step plate is provided for the bumper 32 and the rear wall 33 of such bumper is hinged to the bottom wall, as at 34, to serve as a door that opens downwardly. A lock 35 secures the door 33 in closed position against the top wall of the bumper. Otherwise, the bumper is constructed similarly to the bumper 10 of FIGS. 1–4 and is similarly secured to the chassis or frame of automotive vehicle 36.

If the hinge attachment of rear wall 33 to the bumper 32 is sufficiently strong and is of a type that limits hinge action to an arc of 45°, such rear wall or door can be used as a step when in open position. However, rear wall 33 can be hinged at the top of the bumper to open upwardly, if desired.

It should be realized that different chassis or frame constructions of different automotive vehicles will require some modifications in the particular way the compartmented bumper of this invention is interconnected with and attached to the automotive vehicle concerned, but such modifications will be obvious to those skilled in the art and can be adapted as required without substantially altering the inventive concepts here disclosed and claimed.

Also, it will be apparent that the cover or door for the bumper may be secured to the bumper and made openable and closeable in other ways than by hinging, for example, it may be a sliding cover or door utilizing well-known construction techniques.

Whereas this invention is here described and illustrated with respect to certain preferred forms thereof, it is to be understood that many variations are possible without departing from the subject matter particularly pointed out in the following claims, which subject matter I regard as my invention.

I claim:

1. An automotive vehicle bumper, comprising rigid and strong walls rigidly and strongly secured together to define an elongate box of vehicle bumper formation, an exposed longitudinal face of said box being open along substantially its entire length; rigid and strong partition walls extending transversely of the interior of said box in mutually spaced relationship and rigidly and strongly joined to said box walls and extending outwardly thereof for interconnection with and attachment to the structural frame portion of an automotive vehicle, said partition walls dividing the interior of the bumper into article-storage compartments and at least one of said partition walls being partially cut away to accommodate long articles; (a) an elongate closure for the said open face of the box; and means securing said closure to the box so it can be opened and closed with respect to said box opening.

2. An automotive vehicle bumper according to claim 1, wherein the top of the box is open, and the closure provides the top wall of the bumper.

3. An automotive vehicle bumper according to claim 2, wherein a step plate is secured at the bottom of the bumper and projects outwardly therefrom as a step leading to the top of the bumper.

4. An automotive vehicle bumper according to claim 1, wherein the box is open along the elongate side of the bumper opposite the outward extension of the partition walls; and the closure provides a covering wall therefor.

5. An automotive vehicle bumper according to claim 4, wherein the closure is hinged at the bottom of the box to swing open downwardly and stop at horizontal position as a step.

6. An automotive vehicle bumper according to claim 1, wherein the outward extensions of the partition walls serve as outer lateral walls of an intermediate box extension.

7. An automotive vehicle bumper according to claim 1, wherein the interior of the intermediate box extension is open to the interior of the bumper proper as an extension of one of the compartments therein.

References Cited

UNITED STATES PATENTS

| | | | |
|---|---|---|---|
| 1,486,222 | 3/1924 | Berry | 293—69 |
| 1,609,274 | 11/1926 | McFadden. | |
| 1,733,347 | 10/1929 | Holmes. | |
| 2,993,721 | 7/1961 | Bowman | 293—69 |

FOREIGN PATENTS 959,552   10/1949   France.

GERALD M. FORLENZA, Primary Examiner

F. E. WERNER, Assistant Examiner

U.S. Cl. X.R.

280—164, 505; 293—1, 69